Nov. 21, 1961   G. A. LYON   3,009,743
WHEEL COVER
Original Filed June 10, 1954   2 Sheets-Sheet 1
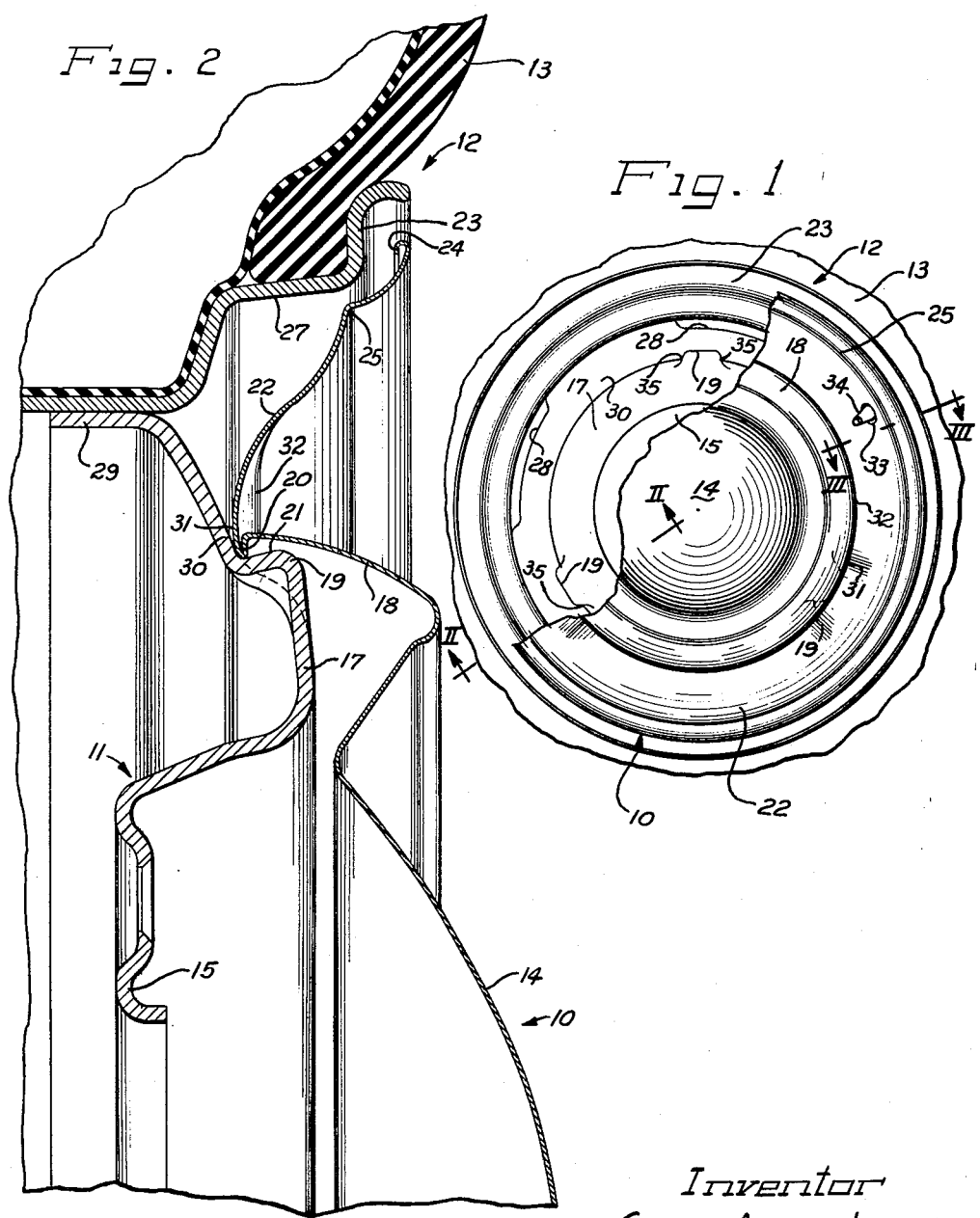
Inventor
GEORGE ALBERT LYON Nov. 21, 1961 G. A. LYON 3,009,743
WHEEL COVER
Original Filed June 10, 1954 2 Sheets-Sheet 2
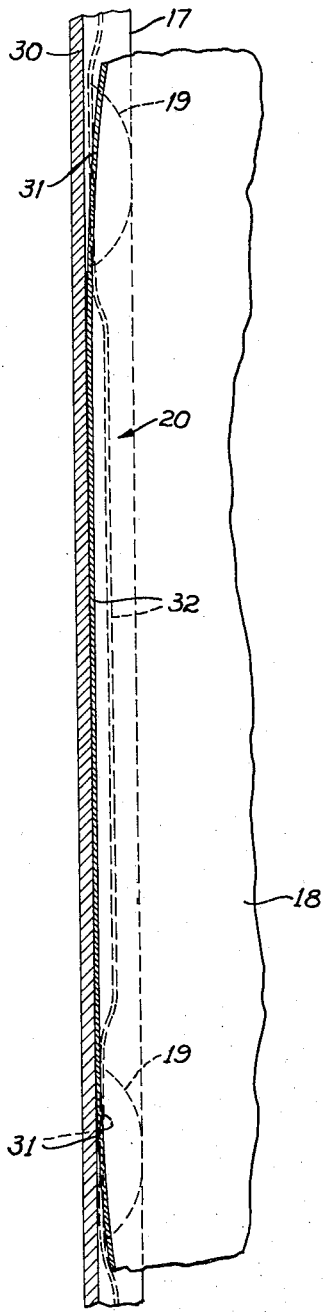
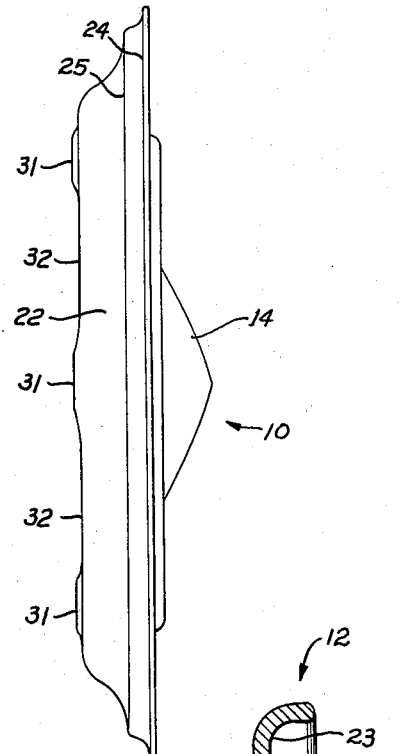
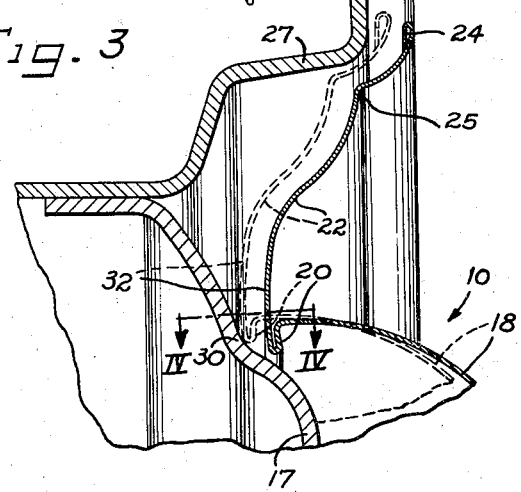
Inventor
GEORGE ALBERT LYON
by *Hill, Sherman, Meroni, Gross & Simpson* Attys.

United States Patent Office 3,009,743
Patented Nov. 21, 1961

3,009,743
WHEEL COVER
George Albert Lyon, 13881 W. Chicago Blvd.,
Detroit 28, Mich.
Original application June 10, 1954, Ser. No. 435,724, now Patent No. 2,862,768, dated Dec. 2, 1958. Divided and this application June 13, 1958, Ser. No. 741,922
14 Claims. (Cl. 301—37)

The present invention relates to improvements in wheel structures and more particularly concerns the ornamental and protective covering of the outer sides of vehicle wheels such as automobile wheels.

This application is a division of my application Serial No. 435,724 filed June 10, 1954, now Patent No. 2,862,768 dated December 2, 1958.

An important object of the present invention is to provide an improved wheel structure wherein a cover is disposed at the outer side thereof and retained in position by engagement with bumps on the wheel body.

Another object of the invention is to provide an improved wheel structure wherein a cover is maintained on the outer side of the wheel in engagement with retaining bumps on the wheel body but under less stretching of the retaining portion of the cover, but nevertheless improved retention of the cover.

A further object of the invention is to provide an improved wheel structure provided with a novel structure on the wheel cover enabling application of a cover to the wheel in association with retaining bumps on the wheel body with substantially less stretching of the bump-engaging portion of the cover in the application and removal of the cover than has been generally expedient in prior constructions.

Still another object of the invention is to enable the retaining portion of a wheel cover engageable with retaining bumps on a wheel body to be substantially stiffer and requiring less resilient deflectability than in prior structures.

Yet another object of the invention is to provide an improved expedient for applying and removing a wheel cover with respect to a wheel body having bumps thereon for retention of the cover.

A still further object of the invention is to provide an improved cover for disposition at the outer side of a vehicle wheel provided with retaining bumps by which the cover is adapted to be retained on the wheel.

Other objects, features and advantages of the present invention will be readily apparent from the following detailed description of a preferred exemplary embodiment as shown on the accompanying drawings, in which:

FIGURE 1 is a side elevational view of a vehicle wheel embodying features of the invention and showing a wheel cover partially broken away for purpose of clarity;

FIGURE 2 is an enlarged fragmentary radial sectional view taken substantially on the line II—II of FIGURE 1;

FIGURE 3 is an enlarged fragmentary sectional detail view taken substantially on the line III—III of FIGURE 1;

FIGURE 4 is a more or less schematic, developed sectional elevational view taken substantially on the line IV—IV of FIGURE 3, and having regard to the dash outline position of the cover in FIGURE 3; and FIGURE 5 is an edge elevational view of the cover of the present invention.

According to the present invention a cover 10 is adapted to be applied to the outer side of a vehicle wheel comprising a disk spider body 11 supporting a multi-flange, drop-center tire rim 12 adapted to carry a pneumatic tire and tube assembly 13. If preferred, of course, a pneumatic tire of the tubeless type may be used.

By preference, the cover 10 is made from sheet metal such as stainless steel or sheet brass, or the like, and in this instance is of the full disk type in which a single sheet metal plate is of a diameter to substantially cover not only the wheel body 11 but also the tire rim 12. To this end, the cover 10 comprises a central crown portion 14 for substantially overlying a central bolt-on flange 15 of the wheel body and an intermediate annular axially outwardly directed reinforcing nose bulge 17 of the wheel body. At its radially outer side the crown portion 14 of the cover is provided with a generally axially inwardly directed annular flange wall portion 18 adapted in assembly with the wheel to lie in spaced relation at the radially outer side of the nose bulge 17 about a series of equally peripherally spaced generally radially outwardly projecting cover-retaining bumps 19 pressed from the material at the radially outer side of the nose bulge.

Cover retaining interengagement of the cover 10 with the retaining bumps 19 is effected by means of retaining ring structure, in this instance comprising an inturned annular intermediate cover-retaining bead or fold flange 20 projecting generally radially inwardly and extending slightly obliquely axially outwardly at the axially inner terminus of the crown side wall flange 18 and engaging under resilient tension with generally undercut axially and radially inwardly sloping oblique retaining shoulders 21 on the bumps 19.

It will be observed that the retaining flange fold 20 comprises part of the juncture with the side of the crown of the cover of a radially outer annular integral portion 22 of the cover which extends in overlying relation to the juncture between the wheel body and the tire rim and substantially concealingly overlies the tire rim. To this end, the cover portion 22 extends generally radially and axially obliquely outwardly and is of a diameter to overlie a terminal flange 23 of the tire rim, with the outer edge extremity of the cover provided with an underturned reinforcing and finishing bead-like flange 24. Intermediately the cover portion 22 is provided with an annular axially inwardly indented reinforcing rib 25 which in assembly with the wheel preferably lies opposite the juncture of the terminal flange 23 of the tire rim with an intermediate generally axially extending flange 27 of the tire rim. Thereby a reinforced pry-off shoulder is provided by the rib 25 spaced inwardly from the reinforcing edge bead 24. Moreover, by the spaced relation of the cover portion 22 relative to the tire rim 12, air circulation and dirt escape passage is provided cooperatively related to wheel openings 28 provided at appropriate intervals by insetting of an axially inwardly directed attachment flange 29 on the outer margin of the wheel body 11 which is secured in suitable manner to the base of the tire rim 12.

Novel means are provided to facilitate not only application of the cover 10 to the wheel, but also pry-off of the cover. Such means have been devised to enable application and removal of the cover with minimum radial stretching or resilient deflection of the retaining bead or fold flange 20, thus permitting closer tolerance and tighter grip of the retaining bead flange 20 with the retaining bumps 19. To this end, the retaining bumps 19 are preferably three in number spaced equidistantly apart and therefore affording substantial space therebetween exposing a substantial area radially outwardly from the reinforcing nose bulge 17 of the wheel body to the portions of the cover between the retaining bumps. Immediately radially outwardly adjacent to the inner ends of the bump shoulders 21 and in an annular generally axially outwardly facing area of the wheel body between the retaining bumps and the attachment flange 29, the wheel body is formed to provide a bottoming shoulder 30 against which the axially inner side of the retaining flange fold 20 of the cover is engageable to determine the axially inward disposition of the cover when fully applied to the wheel, for thereby maintaining the radially outer portion 22 of the cover in predetermined spaced relation to the tire rim.

In order to facilitate application and removal of the cover 10 with respect to the outer side of the wheel and more particularly with respect to the retaining bumps 19, means are provided for enabling cocked interengagement of two of the three retaining bumps by the retaining ring or fold flange structure 20 and then snapping interengagement of the retaining fold flange structure with the remaining bump 19. To this end, the retaining fold flange ring structure 20 is provided at suitable intervals corresponding to the spaced disposition of the retaining bumps 19 with axially inwardly offset portions 31 (FIGS. 2, 4 and 5) and with intervening inset or axially outwardly depressed clearance areas 32. Thereby, in applying the cover to the outer side of the wheel two of the bump engaging axially inwardly offset portions 31 are oriented with respect to two adjacent ones of the retaining bumps 19 as, for example, by registering a valve stem aperture 33 with a valve stem 34 located to project from the tire rim midway between two of the retaining bumps 19 as best seen in FIGURE 1. In the dash outline position of FIGURE 3 is shown this initial tilted in relation or canter position of the cover 10 wherein the inset intermediate portion 32 aligned with the valve stem aperture 33 is bottomed against the wheel shoulder portion 30. In FIGURE 4 this relation is shown in full line and also indicates how through this maneuver the two next adjacent bump engaging offset portions 31 are thereby substantially fitted in behind the retaining bumps 19 and more particularly the retaining shoulders 21 thereof.

Since the retaining shoulder ring bead 20 at the retaining portions 31 now engages the two bumps 19 at the axially inner sides of the respective shoulders 21 of the bumps and thus at the radially inward extremity or smallest diameter defined by the undercut retaining shoulders 21 of the bumps, radially outward resilient deflection of the retaining shoulder ring flange 20 will be required only at one point, namely at the remaining one of the offset retaining portions 31 to cam over the radially outwardly projecting nose of the remaining bump 19 to snap down into engagement with the undercut retaining shoulder 21 thereof.

In the full line position of FIGURE 3 and the dash outline position of FIGURE 4, the cover is shown after the diametrically opposite side portion and more particularly the retaining portion 31 thereof has been snapped over the remaining retaining bump 19 so that the cover assumes a centered substantially level relation to the wheel. It will be observed that in the final retaining interengagement of the offset retaining portions 31 with the respective retaining bumps 19, the intermediate inset portions 32 stand in axially outwardly spaced relation to the wheel body shoulder 30 while as best seen in FIGURE 2 the offset retaining portions 31 bottom against such shoulder at the bases of the retaining bump shoulders 21.

While for purposes of symmetry the cover has been shown with three of the inset portions 32, it will be appreciated that one of such portions would suffice in alignment with the valve step aperture 33. However, there is an advantage in having three such inset portions 32 in that when it is desired to pry the cover free from the wheel greater latitude is permitted. It will be appreciated, of course, that in prying the cover from the wheel, just the reverse action will take place from that described in applying the cover to the wheel. That is, as the cover is pried axially outwardly by means of a pry-off tool such as a screwdriver or the like, applied behind the outer margin of the cover and behind the pry-off rib 25, the pry-off force will be adjacent to one of the retaining portions 31 of the retaining fold flange ring. Such portion of the retaining flange ring will yield resiliently radially outwardly as it cams generally axially outwardly along the undercut retaining shoulder 21 of such bump. At the same time the opposite side of the cover will tilt generally axially inwardly as enabled by the respective inset portion 32 between the remaining two retaining portions 31 of the cover retaining ring. Thus, the portions of the cover contiguous and in engagement with the remaining two retaining bumps 19 is relieved from undue deflection as an incident to pry-off. In the absence of the inset relieving portion 32 toward which the cover tilts during pry-off, those portions of the retaining ring flange 20 engaging the retaining bumps at each opposite side of the tilted-in portion would be forced to climb or cam at least a substantial distance axially outwardly along the incline of the retaining shoulders 21 of the respective bumps. Hence, at the same time as the stretching or deflection of the retaining ring flange 20 adjacent the point of pry-off, there would also necessarily have to be stretching and deflection of the opposite portions of the retaining flange ring by virtue of the progressively increasing diameter defined by the retaining shoulders 21 axially outwardly from the wheel body shoulder 30. By the present invention, however, such stretching or deflection is avoided and thus the retaining ring flange 20 is relieved of undue strain even though it may be of substantial stiffness.

In order to clear the uptilted portions of the retaining flange ring bead 20 at opposite sides of the offset retaining portions 31 and especially during canting in of such portions in applying or removing the cover, the circumferentially opposite sides of the retaining bumps 19 are preferably chamfered or rounded off as shown at 35. The value of this expedient can be appreciated on referring to FIGURE 4 where it will be seen that the flange bead 20 arcs past and around the respective adjacent retaining bumps 19 as it is canted axially inwardly in the intervening inset portions 32 and as it rocks into the final centered, squared up or level relation to the wheel in the final assembly.

From the foregoing it will be observed that the annular retaining ring bead or flange structure may be of fairly stiff resilience since substantial stretching or resilient deflection will occur primarily at one point and equalization stretching or resilient yielding at the remaining points engaging the retaining bumps need be of only quite minor extent following the snapping of the one resiliently deflected portion over the one bump. The portions of the retaining ring structure which engage the initially contacted retaining bumps in effect fulcrum on the contiguous portions of the wheel body and of the axially inner end portions of the retaining shoulder faces of the retaining bumps as the opposite side of the cover is snapped inwardly onto the wheel.

As the term "retaining ring structure" shall be used in the claims, it is intended to mean the retaining ring flange or bead shown in the present application, or any equivalent thereof, engageable retainingly under resilient tension with the retaining bumps and at least stiffly resiliently flexible for stretching or resiliently deflecting over one of the bumps when the cover is applied to the wheel or removed from the wheel as herein described. When fully engaged with the retaining bumps, the retaining ring structure maintains an equalized strong resilient tensioned grip upon the undercut retaining shoulders of the retaining bumps on the wheel.

It will be understood that modifications and variations may be effected without departing from the scope of the novel concepts of the present invention.

I claim as my invention:

1. In a vehicle wheel structure including a wheel body having generally radially extending retaining bumps, a cover body having thereon a generally radially extending retaining ring structure with portions thereof engageable with the retaining bumps and portions of the cover body and the retaining ring structure intermediate the portions for engaging with the retaining bumps being inset axially outwardly for cocking clearance with respect to the underlying portions of the wheel body incident to attachment and removal of the cover.

2. In a vehicle wheel structure having retaining bumps on a wheel body, a cover body having a retaining ring structure therebehind provided with axially inwardly offset portions for engagement with adjacent retaining bumps and an axially outwardly inset intermediate area for cocking clearance with respect to the wheel body intermediate the bumps so that the bump-engaging portions of said retaining ring structure can fulcrum on the engaged portions of the adjacent retaining bumps as an incident to snapping and stretching of a portion of the ring structure at the opposite side of the cover over another of the retaining bumps.

3. In a wheel structure including a tire rim and a wheel body of the disk spider type having an annular intermediate nose bulge between a radially inner bolt-on flange and a radially outer marginal portion attached to the tire rim, with a circumferentially spaced series of generally radially outwardly projecting cover retaining bumps on the radially outer side of the nose bulge spaced radially inwardly from the marginal extremity of the wheel body so that a substantial outer marginal portion of the wheel body facing generally axially outwardly intervenes between the bumps and said marginal extremity, a cover for disposition at the outer side of the wheel and provided with generally radially inwardly directed retaining ring structure engageable in snap-on, pry-off relation with said bumps, said retaining ring structure having a portion thereof inset axially outwardly intermediate a pair of relatively axially inwardly offset bump-engaging portions for enabling cocked initial assembly disposition of the cover with the wheel by closely approaching disposition of said intermediate inset portion to said wheel body portion between a pair of said retaining bumps and fulcruming engagement of said pair of offset portions with said pair of bumps while at the generally opposite side of the cover the retaining ring structure is resiliently flexed over another of the bumps in snapping the cover in place on the wheel, and enabling convenient pry-off of the cover by reversal of the assembly action as aforesaid.

4. In a wheel structure including a tire rim and a wheel body of the disk spider type having an annular intermediate nose bulge between a radially inner bolt-on flange and a radially outer marginal portion attached to the tire rim, with a circumferentially spaced series of generally radially outwardly projecting cover retaining bumps on the radially outer side of the nose bulge spaced radially inwardly from the marginal extremity of the wheel body so that a substantial outer marginal portion of the wheel body facing generally axially outwardly intervenes between the bumps and said marginal extremity, a cover for disposition at the outer side of the wheel having a retaining ring structure engageable in resiliently tensioned relation with the retaining bumps, said retaining ring structure having a portion thereof indented and inset generally axially outwardly to enable canted approach thereof into close proximity to said outer marginal portion of the wheel body incident to applying or removing the cover by fulcruming said retaining ring structure on a pair of said bumps.

5. In a wheel structure including a tire rim and a wheel body having an annular nose bulge with radially outwardly projecting generally undercut retaining bumps on the radially outer side thereof and with the wheel body radially outwardly adjacent to the retaining bumps providing a bottoming shoulder, a cover for disposition over the outer side of the wheel having a wheel body overlying portion provided with a retaining ring structure in the form of an inturned flange of substantial resilient stiffness retainingly engageable with said bumps and on retaining engagement with the undercut shoulders of the bumps cammingly stressed against the wheel body shoulder radially outwardly from the bumps, said retaining ring flange having a circumferential portion thereof, to be disposed in assembly between a pair of the bumps, generally axially outwardly inset to afford clearance relief for canted application of the cover into engagement with said pair of bumps by engagement of said inset portion against the wheel body radially outward shoulder while the retaining ring flange at the opposite side of the cover is snapped over a remaining bump.

6. In a wheel structure including a tire rim and a wheel body having an annular nose bulge with radially outwardly projecting generally undercut retaining bumps on the radially outer side thereof and with the wheel body radially outwardly adjacent to the retaining bumps providing a bottoming shoulder, a cover for disposition over the outer side of the wheel having a wheel body overlying portion provided with a retaining ring structure in the form of an inturned flange of substantial resilient stiffness retainingly engageable with said bumps and on retaining engagement with the undercut shoulders of the bumps cammingly stressed against the wheel body shoulder radially outwardly from the bumps, said retaining ring flange having a circumferential portion thereof, to be disposed in assembly between a pair of the bumps, generally axially outwardly inset to afford clearance relief or canted application of the cover into engagement with said pair of bumps by engagement of said inset portion against the wheel body radially outward shoulder while the retaining ring flange at the opposite side of the cover is snapped over a remaining bump, the cover having radially outwardly from said retaining ring flange and integral therewith a marginal portion for overlying the remainder of the wheel body and the tire rim.

7. In a wheel structure including a tire rim and a wheel body having an annular nose bulge with radially outwardly projecting generally undercut retaining bumps on the radially outer side thereof and with the wheel body radially outwardly adjacent to the retaining bumps providing a bottoming shoulder, a cover for disposition over the outer side of the wheel having a wheel body overlying portion provided with a retaining ring structure in the form of an inturned flange of substantial resilient stiffness retainingly engageable with said bumps and on retaining engagement with the undercut shoulders of the bumps cammingly stressed against the wheel body shoulder radially outwardly from the bumps, said retaining ring flange having a circumferential portion thereof, to be disposed in assembly between a pair of the bumps, generally axially outwardly inset to afford clearance relief for canted application of the cover into engagement with said pair of bumps by engagement of said inset portion against the wheel body radially outward shoulder while the retaining ring flange at the opposite side of the cover is snapped over a remaining bump, the cover having radially outwardly from said retaining ring flange and integral therewith a marginal portion for overlying the remainder of the wheel body and the tire rim, said radially outer portion of the cover having an indented pry-off rib extending generally axially inwardly toward the tire rim and adjacent thereto and adapted to receive a pry-off tool therebehind in forcing the cover retaining ring structure out of engagement with the retaining bumps.

8. In a cover for disposition at the outer side of a vehicle wheel, a sheet metal cover member having axially inner and axially outer sides and provided at the axially inner side thereof with a bump engaging bead flange structure including a circumferentially spaced pair of bump engaging portions and intermediate said portions, a portion which is inset axially outwardly relative to said bump-engaging portions for enabling canted approach of said retaining portions to a pair of bumps while said inset portion is closely approached to or in engagement with an opposing wheel portion intermediate bumps.

9. In a cover for disposition at the outer side of a vehicle wheel, a sheet metal cover member having axially inner and axially outer sides and provided at the axially inner side thereof with a bump engaging bead flange structure including a circumferentially spaced pair of bump engaging portions and intermediate said portions a portion which is inset axially outwardly relative to said bump-engaging portions for enabling canted approach of said retaining portions to a pair of bumps while said inset portion is closely approached to or in engagement with an opposing wheel portion intermediate bumps, said bump engaging portions and said intermediate inset area comprising part of a continuous bead flange ring structure.

10. In a cover for disposition at the outer side of a vehicle wheel, a sheet metal cover member having axially inner and axially outer sides and provided at the axially inner side thereof with a bump engaging bead flange structure including a circumferentially spaced pair of bump engaging portions and intermediate said portions a portion which is inset axially outwardly relative to said bump-engaging portions for enabling canted approach of said retaining portions to a pair of bumps while said inset portion is closely approached to or in engagement with an opposing wheel portion intermediate bumps, said bead flange structure comprising an intermediate fold between circular radially inner and radially outer portions of the cover.

11. In a full disk cover of sheet metal for disposition over the outer side of a vehicle wheel that has a wheel body with a nose bulge provided with generally radially outwardly projecting undercut retaining bumps, a central crown portion and a radially outer portion integrally joined by a generally radially inwardly folded rib ring flange of a diameter to engage under resilient tension with retaining bumps, said ring rib flange having portions thereof axially inwardly offset relative to axially outwardly inset portions, said offset portions being engageable with retaining bumps and the inset portions affording clearance for canted approach of the cover to a wheel between retaining bumps with which the offset portions are engaged in applying or removing the cover relative to a wheel.

12. In a full disk cover of sheet metal for disposition over the outer side of a vehicle wheel that has a wheel body with a nose bulge provided with generally radially outwardly projecting undercut retaining bumps, a central crown portion and a radially outer portion integrally joined by a generally radially inwardly folded rib ring flange of a diameter to engage under resilient tension with retaining bumps, said ring rib flange having portions thereof axially inwardly offset relative to axially outwardly inset portions, said offset portions being engageable with retaining bumps and the inset portions affording clearance for canted approach of the cover to a wheel between retaining bumps with which the offset portions are engaged in applying or removing the cover relative to a wheel, said radially outer portion of the cover having portions thereof adjacent to said rib ring flange offset and inset in line with said offset and inset portions of the rib ring flange.

13. In a full disk cover of sheet metal for disposition over the outer side of a vehicle wheel that has a wheel body with a nose bulge provided with generally radially outwardly projecting undercut retaining bumps, a central crown portion and a radially outer portion integrally joined by a generally radially inwardly folded rib ring flange of a diameter to engage under resilient tension with retaining bumps, said ring rib flange having portions thereof axially inwardly offset relative to axially outwardly inset portions, said offset portions being engageable with retaining bumps and the inset portions affording clearance for canted approach of the cover to a wheel between retaining bumps with which the offset portions are engaged in applying or removing the cover relative to a wheel, the cover having in line with one of said inset portions a valve stem aperture.

14. In a wheel structure including a tire rim and a wheel body having an annular nose bulge with radially outwardly projecting retaining bumps, the tire rim carrying a valve stem located substantially midway between two of said bumps, a cover for disposition at the outer side of the wheel having bump-engaging ring structure of substantial resilient stiffness provided intermediate a radially inner and a radially outer portion of the cover, said radially outer portion of the cover being of a dimension to overlie the tire rim and having a valve stem aperture therethrough through which the valve stem is adapted to project, said bump-engaging ring structure having in line with said valve stem aperture an axially outwardly inset portion to afford clearance relief by which the inset portion may approach closely to the wheel when the cover is canted toward the wheel for registering the valve stem through said valve stem aperture and said ring structure is engaged into retaining position with said pair of bumps between which the valve stem is located for thereafter pressing the ring structure into snap-on engagement with a remaining bump on the opposite side of the wheel body nose bulge.

References Cited in the file of this patent
UNITED STATES PATENTS

| 2,199,888 | Lyon | May 7, 1940 |
| 2,544,703 | Lyon | Mar. 13, 1951 |
| 2,592,584 | Lyon | Apr. 15, 1952 |